Feb. 13, 1951 — P. J. QUINN — 2,541,666
CONTROL SYSTEM
Filed May 12, 1945 — 2 Sheets-Sheet 1

Inventor
Paul J. Quinn
Attorney

Inventor
Paul J. Quinn
Attorney

Patented Feb. 13, 1951

2,541,666

UNITED STATES PATENT OFFICE 2,541,666

CONTROL SYSTEM

Paul J. Quinn, South Orange, N. J., assignor to Curtiss-Wright Corporation, a corporation of Delaware Application May 12, 1945, Serial No. 593,527

21 Claims. (Cl. 175—355)

This invention relates to improvements in speed-control systems for prime movers.

One object of the invention is to provide a control system which is electronic in character and hence which eliminates the use of moving parts heretofore considered necessary and in so doing obtains simplicity and economy in design, minimizes mechanical failure, and avoids wear and other losses as a result of friction and lags due to inertia.

A still further object is a system wherein provision is made for avoiding over-corrections by, and hence excessive use of, the mechanism which is controlled by the system and which, in turn, controls the prime mover, this object contemplating a system which is stabilized to tolerate lags in the response of the prime mover which result from the inertia of the prime mover and its load and which attend changes in the speed of the prime mover and load.

A still further object is a control system which is highly sensitive and stable in operation and non-responsive to spurious actions of the controlled apparatus such as, for example, the torsional vibrations of the drive shaft of a prime mover.

A still further object is a control system which is simple in design, dependable in operation and wherein any change in the level of operation may be accomplished in a substantially continuous operation regardless of the magnitude of such change.

A still further object is a novel arrangement of the component parts of the system, whereby to facilitate assembling, testing and adjusting operations and reduce and simplify maintenance.

A still further object is to provide a control system which may be adapted with facility to different types of apparatus and to the operation of any particular apparatus under different conditions.

The invention is illustrated in the accompanying drawings, in which.

Figure 1:
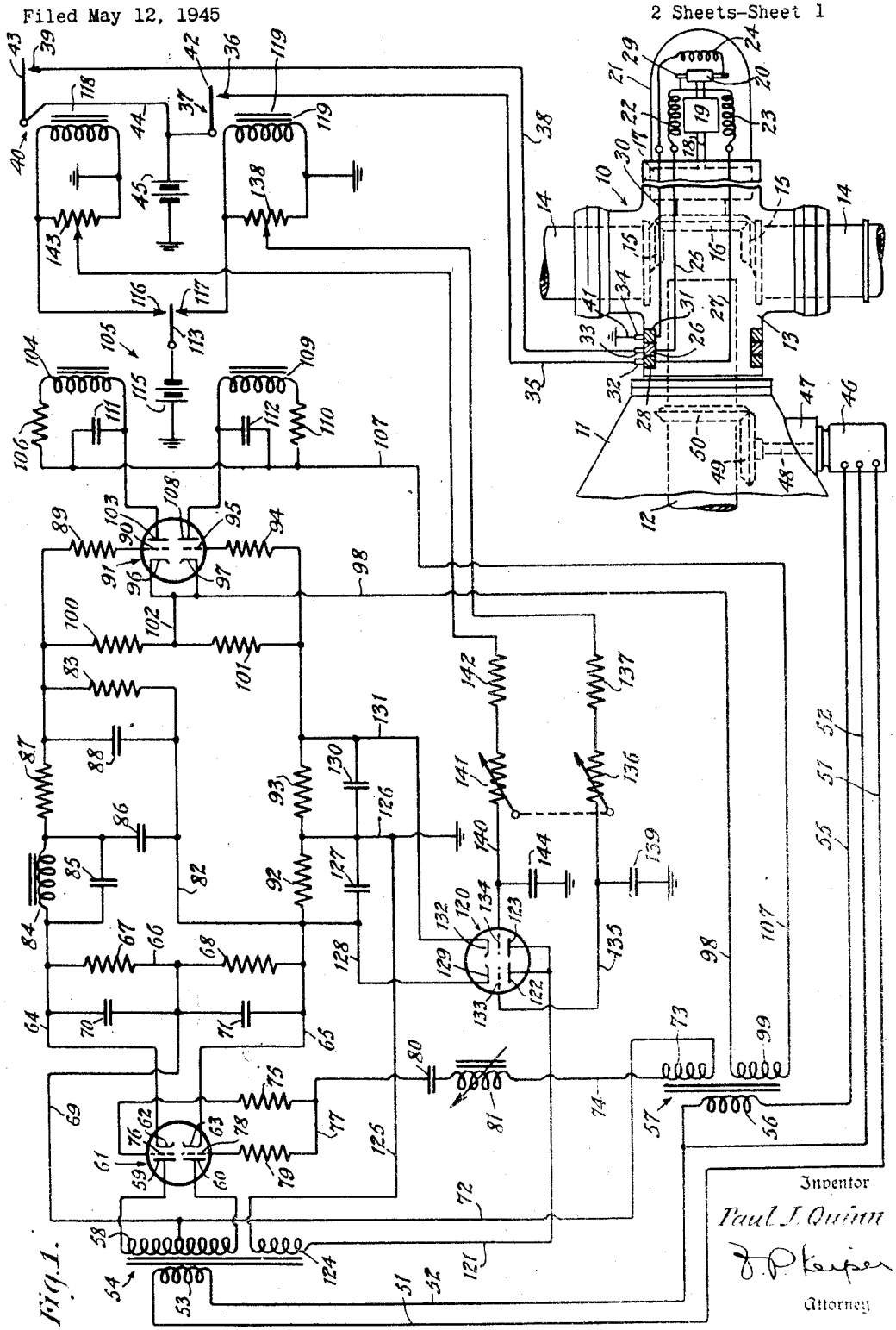
Figure 1 is a wiring diagram of a control system embodying the features of the invention.

The system may be availed of as a governor for an engine-propeller combination and is so illustrated by way of example, it being understood that the system lends itself readily for synchronizing such combinations when the latter are employed in multiple.

The engine-propeller combination, indicated at 10, is sufficiently illustrated for the purpose in view by a showing of the nose section 11 of the engine and the drive shaft 12 which extends through the nose section, the hub 13 of the propeller of the combination being splined or otherwise secured upon the outer end of the drive shaft and carrying blades 14. The propeller is of the electric, variable-pitch type, the root ends of the blades 14 being journaled in the hub and carrying bevel gears 15 which mesh with a ring gear 16. The latter is connected through suitable reduction gearing 17 to a shaft 18 which carries the armature 19 and commutator 20 of an electric motor 21. The latter is reversible, having oppositely wound field coils 22 and 23, and also having a brake disengaging coil 24. A conductor 25 connects one end of the field coil 22 to a slip ring 26 on the inner end of the propeller hub while a conductor 27 connects the corresponding end of the field coil 23 to a similar slip ring 28, the opposite ends of the two field coils being connected to one of a set of brushes 29. One end of the brake disengaging coil 24 is connected to the other of the brushes 29 while its opposite end is connected by a conductor 30 to a third slip ring 31. Brushes 32, 33 and 34 cooperate with the slip rings 26, 28 and 31, respectively, a conductor 35 connecting the brush 32 to a contact 36 of a relay 37, a conductor 38 connecting the brush 33 to a contact 39 of a relay 40 while the brush 34 is grounded by a line 41. A movable arm 42 of the relay 37 and a similar arm 43 of the relay 40 are connected by a common line 44, which, in turn, is connected to one side of a battery 45, the opposite side of which is grounded. It will thus be apparent that when the relay 37 is closed by engagement of the arm 42 thereof with the contact 36, the field coil 23 of the motor 21 will be energized to cause rotation of the armature of the motor in one direction while when the relay 40 is closed by engagement of the arm 43 with the contact 39, the field coil 22 will be energized to cause rotation of the armature of the motor in the opposite direction. The pitch of the blades 14 may, therefore, be increased by closing one of the relays 37, 40 and decreased by closing the other of the said relays, it being noted in this connection that the coil 24 is connected in series with the particular field coil which is energized and hence that the brake, which normally resists rotative movement of the motor armature, is disengaged simultaneously with the energization of either of the field coils so that free rotary movement of the armature will be permitted. Although the electric propeller shown and described is of standard design, it is to be understood that the control system herein described is not limited to propellers of this or any other particular type.

Figure 2:
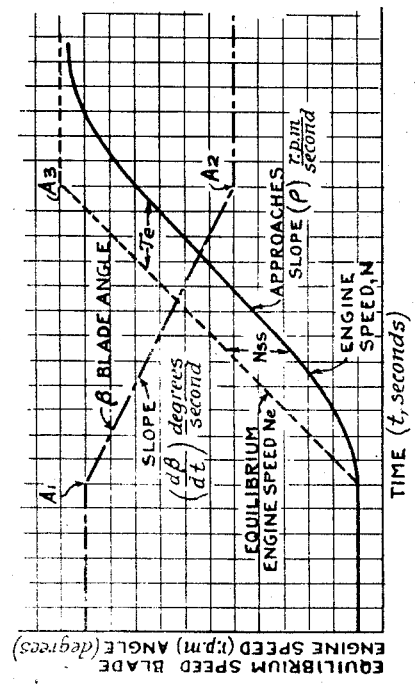
Figure 2 is a diagram showing the fundamental relations involved in the case of an engine-propeller combination.

A propeller pitch-change mechanism of the type illustrated is characterized by a definite time rate of blade angle change when a correction is made while the engine sensitivity to blade angle changes, may, for all practical purposes, be considered constant. Referring to Figure 2, wherein it is assumed that starting at $A_1$ a decreasing pitch correction is initiated at the rate of $$-\frac{d\beta}{dt}$$

degrees per second, it will be apparent that since the blade angle sensitivity, $$\frac{\delta N}{\delta \beta}$$

is usually negative in value, the resultant rate of change of equilibrium engine speed, may be expressed as:

$$-\left(-\frac{d\beta}{dt}\right)\left(\frac{\delta N}{\delta \beta}\right) = \rho \frac{\text{R. P. M.}}{\text{second}} \quad (1)$$

where $\rho$ is the slope of the equilibrium engine speed curve. Owing to the inertia of the engine-propeller combination, the engine speed, N, will not immediately attain this level but will lag behind, as shown, the curve of the engine speed having the relation $$\Delta N = \rho t - \rho \tau e \left(1 - \epsilon^{-\frac{t}{\tau e}}\right) \quad (2)$$

where $\tau e$ is the engine-propeller characteristic time, $\epsilon$ is the natural log base 2.718 and $t$ is the time measured from the instant designated by $A_1$. It will thus be apparent that during correction of the engine speed the latter will lag the equilibrium speed by the steady state lag, $Nss$, which may be expressed as $$Nss = \rho \cdot \tau e \quad (3)$$

If the correction terminates at $A_2$, the equilibrium speed will become constant at $A_3$ and the engine speed will approach along a curve $$\Delta N = (Ne - N)\left(1 - \epsilon^{-\frac{t}{\tau e}}\right) \quad (4)$$

where $t$ is the time measured from $A_2$ and N and Ne are also measured at the same instant.

From the foregoing, it will be apparent that as the engine speed lags the equilibrium speed during pitch corrections, de-energization of the pitch-change motor when the engine speed reaches the selected level will result in an engine speed excursion beyond such level, thereby necessitating a reversal of the pitch-change motor to reduce the pitch of the propeller and initiate a further correction. A number of reversals of the pitch-change motor may thus be required before the engine is "on-speed." In order to avoid the objections noted, the invention contemplates a system wherein provision is made for anticipating, and compensating for, the lag between the engine speed and the equilibrium speed. To this end, the control system includes a two-phase alternator 46 which is mounted on a pad 47 formed, or provided, for this purpose on the nose section of the engine, the rotor shaft 48 of the alternator being connected to the drive shaft 12 by gears 49 and 50. The output frequency of the alternator is thus proportional to the speed of the engine 11.

Preferably the alternator is wound so that the two phases are 90° apart, two of the output lines 51 and 52 being connected across the primary 53 of a transformer 54 while the line 52 and a third line 55 are connected across the primary 56 of a transformer 57. The opposite sides of a secondary 58 of the transformer 54 are connected to companion anodes 59 and 60 of a tube 61. The cathodes 62 and 63 of the latter are connected to output lines 64 and 65, respectively. A load line 66, which is connected across the two output lines, includes resistors 67 and 68 while a line 69, which is connected at one end to the load line between the two resistors, is connected to a center tap on the secondary 58. A condenser 70 is connected across the resistor 67 between the lines 64 and 69 while a similar condenser 71 is connected across the resistor 68 between the lines 69 and 65. A continuation 72 of the line 69 is connected to one side of a secondary 73 of the transformer 57, the other side of the secondary 73 being connected by a line 74 through a grid-current limiting resistance 75 to a grid 76 of the tube 61. A branch line 77 leads from the line 74 and is connected to another grid 78 of the tube 61 through a grid-current limiting resistance 79. A condenser 80 and inductance 81 are included in the line 74, the condenser and inductance being resonant to the alternator frequency when the engine is "on-speed" and the inductance being variable so that the resonant frequency of the circuit may be adjusted over a range corresponding to the speed range of the engine.

The tube 61 serves to discriminate between alternator frequencies above or below the alternator frequency which corresponds to the desired engine speed. In this connection it will be apparent, the voltage on the plate 59 of the tube 61 being 180° out of phase with the voltage on the plate 60, that when the condenser 80 and inductance 81 are resonant, the voltage on the grids 76 and 78 will lag the voltage on one plate by 90° and lead the voltage on the other plate by the same amount. Consequently currents of equal magnitude and opposite polarity respectively will flow through the resistors 67 and 68. Equal and opposite voltages will, therefore, build up across the said resistors, and hence across the condensers 70 and 71 and across the output lines 64 and 65.

When, however, the engine is "off-speed," the output frequency from the alternator 46 will be either higher or lower than the resonant frequency of the condenser 80 and inductance 81 and the phase of the grid voltage will be proportionately ahead or behind with respect to the resonant relation, depending, of course, upon whether the engine speed is higher or lower than the predetermined level. As a consequence, more current will traverse one of the anode circuits of the tube 61 than the other. When this occurs, the voltage drops across the resistors 67 and 68 are unequal, and as they oppose one another there will be a corresponding voltage across the output lines 64 and 65. The action of the discriminator portion of the circuit, therefore, is such that when the engine is "on-speed" the potential difference between the lines 64 and 65 will be zero whereas when the engine is "off-speed" there will be a voltage across the said lines which is proportional to the difference between the "off-speed" and "on-speed" levels, one of the lines being positive with respect to the other when the engine speed is above the desired level and negative with respect to the other when the engine speed is below such level. It is to be understood in this connection that any other suitable means may be utilized for discriminating between alternator frequencies which may vary with respect to the selected frequency.

The line 64 and a branch line 82, which leads off the output line 65, are connected to the opposite sides of a load resistor 83. Hence the same voltage drop will appear across this resistor as across the lines 64 and 65. A two-stage filter, however, is preferably included in the system in advance of the load resistor 83. One stage includes an inductance 84 which is included in the line 64, a condenser 85 connected across the inductance and a second condenser 86 connected across the lines 64 and 82, the inductance 84 and the condensers 85 and 83 providing a low-pass filter and being adapted primarily to attenuate the frequencies resulting from the torsional vibrations of the drive shaft 12 of the engine-propeller combination. A resistance 87 in the line 64 and a condenser 88 across the lines 64 and 82 provide the second stage of the filter and serve to attenuate the alternator frequencies, whereby the output of the second stage of the filter will be pure, or substantially pure, direct current.

Beyond the load resistance 83, the line 64 is connected through a grid-current limiting resistance 89 to the grid 90 of a relay tube 91 while the line 65 is connected through resistances 92 and 93 and a grid-current limiting resistance 94 to a grid 95 of the tube 91. The cathodes 96 and 97 of the tube 91 are connected by a common line 98 to one side of a secondary 99 of the transformer 57. Resistors 100 and 101 for biasing the grids 90 and 95, respectively, are connected in series across the lines 64 and 65, the line including the said resistors being connected by a line 102 to the cathode line 98.

The circuit for an anode 103 of the tube 91 includes a coil 104 of a relay 105, a loading resistance 106, a line 107 and the secondary 99 while the circuit of an anode 108 of the tube 91 includes a coil 109 of the relay 105, a loading resistance 110, the line 107 and the secondary 99. Preferably, a condenser 111 is connected in parallel with the coil 104 and resistance 106, a similar condenser 112 being connected across the coil 109 and resistance 110. The relay 105 controls a movable contact arm 113. The said arm is connected to one side of a battery 115, the opposite side of which is grounded, and is adapted to cooperate with spaced contacts 116 and 117. The relay is so designed that normally the contact arm 113 is located midway between, and out of engagement with, the two contacts.

Neglecting, for the time being, any influence that the resistances 92 and 93 may have, it will be apparent that the series-connected, bias resistors 100 and 101, being in parallel with the resistance 83, will have the same voltages impressed across them as the latter resistance. Hence, when the engine is "on-speed" and the voltage drop is zero, the grids 90 and 95 of the relay tube 91 will have zero bias. As both of the anode circuits of the said tube include the same source of power, the secondary 99 of the transformer 57, there will be the same flow of current through each of the coils 104 and 109 of the relay. Hence, as the poles of one coil are reversed with respect to the poles of the other, the influence of one coil upon the contact arm 113 is neutralized by the influence of the other and the said arm remains out of engagement with both contacts 116 and 117. On the other hand, when the line 64 is positive with respect to the line 65 the resultant flow of current through the resistors 100 and 101 will render the grid 90 more positive than the grid 95 with a result that there will be a greater flow of current through the relay coil 104 than through the relay coil 109. In such a case the arm 113 will be moved into engagement with the contact 116. If the line 65 should become positive with respect to the line 64, then the flow of current through the resistances 100 and 101 in the opposite direction will render the grid 95 more positive than the grid 90 with a result that there will be a greater flow of current through the relay coil 109. In this case, the arm 113 will be moved into engagement with the contact 117.

Engagement of the arm 113 with the contact 116 in the manner described energizes a power relay coil 118 to close the contact 43 and thereby effect operation of the pitch-change motor in one direction while engagement of the said arm with the contact 117 energizes a power relay coil 119 to close the contact 42 and thereby effect operation of the pitch-change motor in the opposite direction.

In accordance with the invention means are provided whereby when either of the field coils of the pitch-change motor is energized in the manner described the control system is automatically conditioned to anticipate, and compensate, for the lag in the speed of the engine with respect to the equilibrium speed during the speed correction. The said means include a feedback tube 120. A line 121 connects anodes 122 and 123 of the said tube to one side of a secondary 124 of the transformer 54. The other side of the secondary 124 is connected by a line 125 to a line 126, one end of which is grounded and the other end of which is connected to the line 65 between the resistances 92 and 93. The line 126 also connects one side of a condenser 127 to ground while the other side of the condenser and the resistance 92 are connected by a line 128 to a cathode 129 of the tube 120. In a like manner the line 126 connects one side of a condenser 130 to ground while the opposite side of the condenser and the resistance 93 are connected by a line 131 to a cathode 132 of the tube 120. Thus one anode circuit of the feedback tube includes the resistance 92 while the other anode circuit includes the resistance 93.

Grids 133 and 134 control the flow of current in the anode circuits of the feedback tube, the grid 133 being connected by a line 135 through a variable resistance 136 and a fixed resistance 137 to a sliding tap on a resistance 138 which is connected in parallel with the power relay coil 119. One side of a condenser 139 is connected to the grid line 135 while the opposite side is grounded. Similarly, the grid 134 is connected by a line 140 through a variable resistance 141 and a fixed resistance 142 to a sliding tap on a resistance 143 which is connected in parallel with the power relay coil 118. One side of a condenser 144 is connected to the grid line 140 while the opposite side is grounded.

From the foregoing, it will be apparent that when the switch arm 113 occupies the neutral position shown, the grids 133 and 134 of the feedback tube, having zero bias, will permit equal, and maximum, flow of current through the anode circuits. Hence, equal, and maximum, voltage drops will appear across the resistances 92 and 93 and, the polar arrangement of the resistances being reversed, the two voltage drops cancel one another. At such times, the voltage drop across the bias resistances 100 and 101 of the relay tube 91 will be zero so that the current through the anode circuits of the latter tube will likewise be equalized.

However, when the contact arm 113 is caused to engage either of the contacts 116 or 117 in the manner described, the resultant flow of current through the resistance 138 or 143, as the case may be, will result in a drop across the said resistance and thereby impress a negative bias upon one of the grids of the feedback tube. The flow of current in the anode circuit controlled by the said grid will thus be reduced so that the voltage across the resistance 92 or 93 in the particular anode circuit will be less than that required to cancel the voltage across the other resistance. As a result, to the voltage appearing across the bias resistors 100 and 101, and which is proportional to the degree of engine off-speed, an artificial or synthetic voltage will be added or subtracted, depending upon which of the resistances 92 and 93 is reduced in effectiveness in the manner described. The artificial or synthetic voltage so produced is added to the negative voltage corresponding to engine off-speed when the system is operative to increase the speed of the engine and is subtracted from the positive off-speed voltage when the system is operative to decrease the speed of the engine. That is, the polarity of the respective feedback voltage across the resistor 92 or 93, depending on the sense of energization of the relay 105, is always such that it is in opposition to the error voltage appearing across resistance 83.

Figure 4:
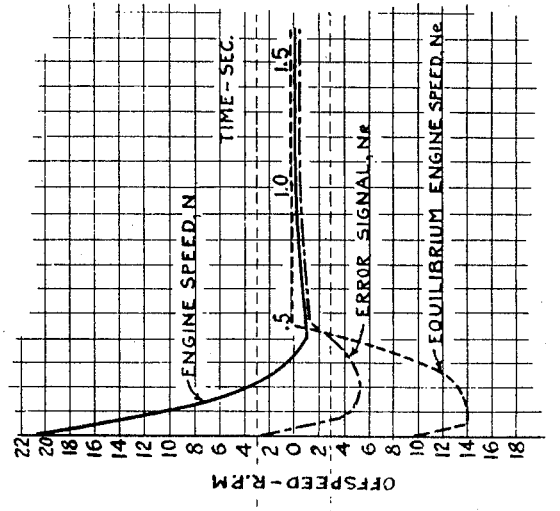
Figure 4 is a similar diagram showing the response of the control system when the engine is above the "on-speed" level by a similar amount.
Figure 3:
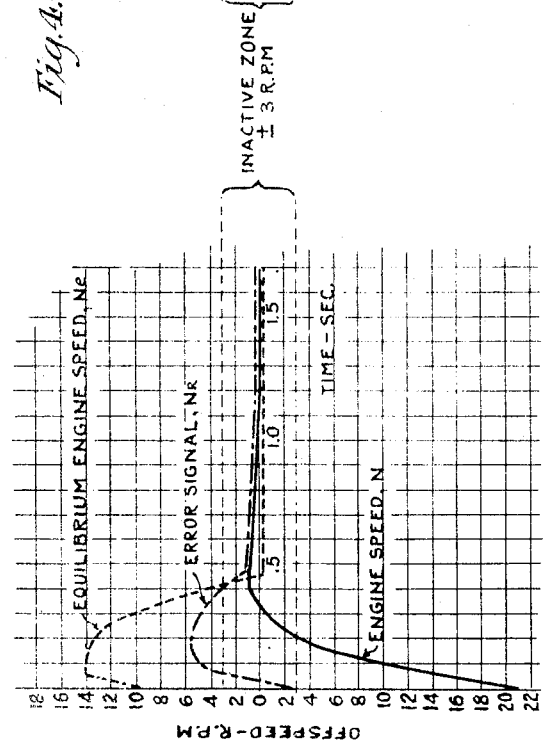
Figure 3 is a diagram showing the response characteristics of the control system when employed in connection with such a combination when the engine speed is below the "on-speed" level.

The artificial or synthetic voltage thus anticipates, and compensates for, the lag between the engine speed and the equilibrium engine speed during change of the engine speed from one level to another. In this connection it will be noted that the feedback voltage produced when the power relay coil 118 is energized is fed to the grid 134 through a time-delay network which includes the resistances 141 and 142 and the condenser 144, while when the power relay coil 119 is energized the feedback voltage is fed to the grid 133 through a time-delay network which includes the resistances 136 and 137 and the condenser 139. The amount of voltage and the characteristics of the time-delay network may vary, depending upon the particular apparatus controlled and the character of response desired. The value of the feedback voltage in the specific example referred to, may be expressed as follows:

$$V_f = \pm V_{fm}\left(1 - \epsilon^{-\frac{t}{\tau c}}\right) + V_{f0}\epsilon^{-\frac{t}{\tau c}} \quad (5)$$

where $V_f$ is the artificial or synthetic voltage added to, or subtracted from, the voltage corresponding to engine "off-speeds," $V_{f0}$ is the initial voltage, if any, existing in the output lines of the circuit at the start of the correction, $\tau c$ is the time lag of the feedback voltage, this being determined by the resistances in the grid lines 135 and 140 and the condensers 139 and 141, and $V_{fm}$ is the maximum value to which the feedback voltage may rise. The value of the feedback voltage may be determined from the equation $$V_{fm} = K\rho\tau e \quad (6)$$

where K, which is dependent upon the values of the resistances 143 and 138, is the feedback factor. The values of K and $\tau c$ determine the manner of operation of the governor. It is preferred, therefore, that these parameters be variable over a substantial range so that optimum response may be obtained under different conditions. The value and effect of these parameters and their relation to the engine-propeller characteristics are shown in Figures 3 and 4 wherein the curves Ne, N, and Nr are represented by the equations $$Ne = Neo \mp \rho\tau m \pm \rho t \pm \rho\tau m \cdot \epsilon^{-\frac{t}{\tau m}} \quad (7)$$

where Neo is the initial equilibrium speed, the significance of the other factors having already been noted, $$N = Neo \mp \rho(\tau m + \tau e) \pm \rho t \mp \frac{\rho\tau m^2}{\tau e - \tau m} \cdot \epsilon^{-\frac{t}{\tau m}} + \left[No - Neo \pm \frac{\rho\tau e^2}{\tau e - \tau m}\right] \cdot \epsilon^{-\frac{t}{\tau m}} \quad (8)$$

and $$Nr = N + V_f \quad (9)$$

where Nr (the error signal or voltage) is the algebraic sum of the engine off-speed voltage and the feedback voltage, the combined voltages appearing across the grid bias resistors 100 and 101, and $V_f$ is the artificial or synthetic feedback voltage of (5) above.

Figure 3 illustrates the action of the system when the values of K and $\tau c$ are selected to give a substantially critically damped response, the equilibrium engine speed and the error signal value being considerably above the engine speed, and above their "on-speed" values, at the outset of the correction, then falling rapidly near the end of the correction period as the engine speed rises, all three curves merging in the inactive zone and approaching the zero axis of the latter. In other words, when the governor speed is advanced, the engine being off-speed, the corresponding engine "off-speed" voltage across the lines 64 and 65, and hence across the bias resistances 100 and 101, will result in energization of the proper power relay coil, for example the coil 118. Thereupon the field coil 22 of the pitch-change motor is energized and the motor is operated in a direction to reduce the pitch of the propeller blades. At the same time, the bias of the grid 134 of the feedback tube is rendered more negative to reduce the flow of current through the resistance 93. Hence the voltage drops across the grid bias resistors 100 and 101 will be increased by the difference between the voltage across the resistance 92 and that across the resistance 93. The power relay coil 118 will, therefore, be deenergized before the engine reaches the desired speed but at a level which will enable the engine to attain such speed as it progresses to equilibrium speed. The time-delay action of the circuit furnishing the artificial or synthetic voltage is so designed that after the pitch-change motor is deenergized, and while the engine-propeller combination is advancing to its equilibrium speed, the voltage across the bias resistances 100 and 101 will be held at a zero value so as to prevent further action of the relay 105, the condenser 144 discharging through the resistances 141, 142 and 143 to ground at the necessary rate. In connection with the foregoing, it will be understood that the time-delay action of the networks furnishing bias to the grids of the feedback tube 120 is of particular advantage when the speed corrections are of small magnitude as it enables operation of the relays for controlling the pitch-change motor before any substantial portion of the feedback voltage becomes effective. The system thus has the advantage, when employed in connection with an engine-propeller combination, that the pitch of the propeller blades may be adjusted to any desired degree in a single, continuous operation of the pitch-change motor. Interrupted or "stepping" operation of the motor to effect the desired correction by intermittent blade movement is thereby avoided as is any tendency of the system to hunt.

A correction for reducing the speed of the engine-propeller unit is made in a similar manner except in this instance the voltage across the resistance 93 is greater than that across the resistance 92 and this difference is subtracted from the voltage drop represented by the engine off-speed. This is clearly illustrated in Figure 4.

It will be apparent that, although the control system is unresponsive to torsional vibrations of the drive shaft of the engine-propeller combination, it is highly sensitive and capable of operation over wide ranges of speed.

The control system shown and described is intended only as one practical application of the invention. Various other embodiments may be availed of for the same, or other, purposes without departing from the spirit of the invention.

What is claimed as new and desired to be secured by Letters Patent, is:

1. A system for controlling apparatus having different levels of operation and which is undergoing a change in operating level lags an equilibrium state, said system including means for changing the operation of said apparatus from one level to a different predetermined level, means for producing a voltage characteristic of the actual level of operation of said apparatus with respect to said pre-determined level, means, including an independent current source, for producing a second voltage, a time-delay circuit through which said second voltage may be added to and subtracted from said first mentioned voltage in accordance with the direction of level change to compensate for the lag in the response of said apparatus, and means responsive to the combined voltages for rendering said first mentioned means inoperative before said apparatus attains said predetermined level of operation.

2. A system for controlling apparatus having different speed levels and which in undergoing a change in level lags an equilibrium speed, said system including means for rapidly changing the speed of said apparatus from one level to a different predetermined level without interruption, and means responsive to the actual speed level of said apparatus, but unresponsive to the actual rate of acceleration thereof, for rendering said first mentioned means inoperative before the speed of said apparatus attains said predetermined level.

3. A system for controlling apparatus having different speed levels and which in undergoing a change in level lags an equilibrium speed, said system including means for changing the speed of said apparatus from one level to a different predetermined level, means for producing a voltage characteristic of the actual speed of said apparatus with reference to said pre-determined level speed, means, including an isolated current source, for producing a second voltage of finite level to compensate for the lag in the response of said apparatus, and means responsive to said voltages for rendering said first mentioned means inoperative before the speed of said apparatus attains said predetermined level.

4. A system for controlling the speed of a power plant having a variable load actuated by a mechanism, said system including means for producing a voltage characteristic of the actual speed of said power plant with respect to a pre-determined speed, means independent of speed error and rate of change thereof for producing a feedback voltage, a time-delay circuit through which said feedback voltage is combined with said first mentioned voltage during correction periods to compensate for the lag in the response of said power plant, and means responsive to the combined voltages for controlling the operation of said mechanism.

5. A system for controlling the speed of a power plant having a variable load actuated by a mechanism, said system including means for producing a voltage characteristic of the actual speed of said power plant with respect to a pre-determined speed, means responsive to said voltage for initiating the operation of said mechanism to correct the speed of said power plant, and means for producing and feeding a synthetic voltage back and combining it with said first mentioned voltage during correction periods, thereby to compensate for the lag in the response of said power plant, said synthetic voltage being independent in value of speed errors or rate of change thereof.

6. A system for controlling the speed of a power plant having a variable load actuated by a mechanism, said system including means for producing a voltage characteristic of the actual speed of said power plant with respect to a pre-determined speed, means responsive to said voltage for initiating the operation of said mechanism to correct the speed of said power plant, and means responsive to said last mentioned means for producing and feeding a synthetic voltage back and combining it with said first mentioned voltage during correction periods, thereby to compensate for the lag in the response of said power plant, said synthetic voltage being independent in value of speed errors or rate of change thereof.

7. A system for controlling apparatus having different speeds and which in undergoing a change in speed lags an equilibrium state, said system including means for producing a voltage characteristic of the instantaneous speed of said apparatus with respect to a pre-determined speed, bi-directional means for correcting the speed of said apparatus, electron tubes, impedance networks coupling said tubes and operative to render said bi-directional means responsive to said voltage, a mixing network, means for producing a synthetic second voltage whose sign depends upon the direction of operation of said bi-directional means, and a time-delay network through which said second voltage may be fed back to said mixing network and combined in the latter with said first mentioned voltage during speed correction periods, said second voltage being added to, or subtracted from, said first mentioned voltage, depending upon the direction of the speed change.

8. A system for controlling apparatus having different levels of operation and which in undergoing a change in operating level lags an equilibrium state, said system including means for changing the operation of said apparatus from one level to a different pre-determined level, means for producing a signal characteristic of the actual level of operation of said apparatus as compared to a selected level, said signal varying in sense and in magnitude proportional to the difference between said actual and selected level, independent means acting in response to the initiation of a changing operation of said first named means for producing a second signal to compensate for the lag in the response of said apparatus, said second signal having a time lag constant substantially that of the equilibrium state lag of said apparatus, and means responsive to said signals in combination for controlling the operation of said first mentioned means.

9. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load control means.

10. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load control means, the magnitude and time constant of said feedback voltage being selected in accordance with the inertia characteristics of said prime mover and said load control means.

11. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load control means, the magnitude and time constant of said feedback voltage being selected in accordance with the inertia characteristics of said prime mover and said load control means to cancel said offspeed and consequently to terminate operation of said speed controller while an offspeed still exists.

12. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load control means, the magnitude and time constant of said feedback voltage being adjustable to critically damp, overdamp and underdamp said system.

13. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load control means, the magnitude and time constant of said feedback voltage being selected to critically damp said system.

14. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load control means, the magnitude and time constant of said feedback voltage being selected to overdamp said system.

15. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing device, means independent of offspeed to produce a finite feedback voltage having a selected time constant, means to apply said voltages to said load control means to cause operation thereof, means to add algebraically the offspeed voltage and the feedback voltage, and means to initiate said feedback voltage dependent on the presence of a voltage at the load contol means, the magnitude and time constant of said feedback voltage being selected to underdamp said system.

16. In a load regulating speed control system for a prime mover having inertia with consequent response lag to changes in load, voltage responsive load control means comprising an electrically operated device also possessing response lag when energized, said lags together acting to delay attainment of a speed correction when a speed error exists, means to sense speed errors including means to produce an offspeed signal in terms of continuous, variable magnitude D. C. voltage, means independent of the offspeed voltage means to produce, electronically, a finite feedback voltage of selected level and time constant, a resistor network associated with the circuit yielding said offspeed voltage by which the feedback voltage is algebraically added to the offspeed voltage, and means responsive to a voltage signal at the load control means to initiate the generation of said selected feedback voltage.

17. In a load regulating speed control system for a prime mover having inertia with consequent response lag to changes in load, voltage responsive load control means also possessing response lag when energized, said lags together acting to delay attainment of a speed correction when a speed error exists, a voltage producing offspeed sensing circuit, means independent of offspeed to produce a finite feedback voltage having a selected time constant, means to add algebraically the offspeed voltage and the feedback voltage comprising a load resistor in the circuit of the offspeed voltage, means to apply said voltages to said load control means to cause operation thereof, and means to initiate said feedback voltage dependent on the presence of a voltage at the load control means, the magnitude and time constant of said feedback voltage being selected in accordance with the inertia characteristics of said prime mover and said load control means, said finite feedback voltage producer comprising an electronic tube having an RC network in its grid circuit and whose grid bias is altered by signals at the load control means, the time constant of said feedback voltage being established by said RC network in the tube grid circuit and the magnitude of the feedback voltage being the tube-output produced voltage drop across said load resistor and varying in accordance with the conductivity of said tube as affected by the grid potential thereof.

18. In a system for controlling the speed of a variable speed rotating mechanism which includes a lag in changing from one speed level to another, said lag including a maximum R. P. M. difference between actual mechanism speed and an instantaneous equilibrium speed, control means to establish a desired speed, signal producing means responsive to a speed error between the mechanism and the control means, separate and independent signal producing means initiated in its operation by a speed error signal and having an arbitrary preselected lag characteristic substantially equivalent to the mechanism lag characteristic and having a maximum magnitude substantially equivalent to said maximum R. P. M. difference between mechanism speed and instantaneous equilibrium speed, means to superimpose said separate signal on said speed error signal in opposed sense, and means responsive to the combined signal to correct the speed of said mechanism.

19. In a system for controlling speed of a variable speed rotating mechanism which includes a lag in changing from one speed level to another, control means to establish a desired speed, signal producing means responsive to a speed error between the mechanism and control means, separate and independent signal producing means initiated in its operation by a speed error signal, having an arbitrarily preselected lag characteristic substantially equivalent to the mechanism lag characteristic, means to superimpose said separate signal on said speed error signal in opposite sense, and means responsive to the combined signals to correct the speed of said mechanism.

20. In a system for controlling a rotating mechanism having a range of rotational speeds, said mechanism in undergoing a change in speed lagging the instantaneous equilibrium speed, an adjustable speed datum, an error signal producing speed sensing device responsive to a difference in speed of said mechanism from said datum, a speed correcting device for said mechanism responsive in its operation to a signal, a separate and independent signal producer operable simultaneously with and in response to operation of said sensing device having arbitrarily preselected lag characteristics substantially equivalent to the lag characteristics of the mechanism, and means to superimpose said separate signal upon said error signal in a sense to reduce the speed error, said superimposed signals being applied to said speed correcting device.

21. In a system for controlling a rotating mechanism having different rotational speed levels and which in undergoing a change in speed level lags the equilibrium instant speed at which the mechanism speed would be in balance by a certain R. P. M., a first means operable to establish a desired speed level, to sense speed errors and to produce an error signal, a separate, independent signal producing means having an arbitrarily preselected lag when in operation substantially equivalent to the mechanism lag and having a speed characteristic when in operation substantially equivalent to said certain R. P. M., means to initiate operation of said separate signal producing means upon initiation of an error signal by said first means, either by a change in desired speed level called for by said first means or by departure of mechanism speed from the established speed level, means to superimpose said separate signal upon said error signal in a sense to reduce the combined signal, and means responsive to the combined signal to change mechanism speed, whereby the mechanism will attain the called-for speed in a minimum interval of time.

PAUL J. QUINN.

REFERENCES CITED

The following references are of record in the file of this patent:

UNITED STATES PATENTS

| Number | Name | Date |
| --- | --- | --- |
| 2,115,086 | Riggs | Apr. 26, 1938 |
| 2,325,401 | Hurlston | July 27, 1943 |
| 2,351,079 | Strobel | June 13, 1944 |
| 2,375,429 | Martin | May 8, 1945 |
| 2,382,847 | Baumann | Aug. 19, 1945 |
| 2,390,084 | Edwards | Dec. 4, 1945 |
| 2,399,685 | McCoy | May 7, 1946 |
| 2,408,451 | Sorenson | Oct. 1, 1946 |
| 2,428,702 | Elliot | Oct. 7, 1947 |

OTHER REFERENCES

Publication "Electronics," November 1944, article by J. G. Clarke, pages 138–142.